(12) United States Patent
Sugiyama

(10) Patent No.: US 11,734,520 B2
(45) Date of Patent: Aug. 22, 2023

(54) DIALOG APPARATUS, METHOD AND PROGRAM FOR THE SAME

(71) Applicant: NIPPON TELEGRAPH AND TELEPHONE CORPORATION, Tokyo (JP)

(72) Inventor: Hiroaki Sugiyama, Kyoto (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 178 days.

(21) Appl. No.: 17/281,937

(22) PCT Filed: Jun. 17, 2019

(86) PCT No.: PCT/JP2019/023790
§ 371 (c)(1),
(2) Date: Mar. 31, 2021

(87) PCT Pub. No.: WO2020/070923
PCT Pub. Date: Apr. 9, 2020

(65) Prior Publication Data
US 2022/0067300 A1    Mar. 3, 2022

(30) Foreign Application Priority Data
Oct. 5, 2018   (JP) ................. 2018-189852

(51) Int. Cl.
*G06F 40/35* (2020.01)
*G10L 15/18* (2013.01)
*G10L 15/22* (2006.01)

(52) U.S. Cl.
CPC .......... *G06F 40/35* (2020.01); *G10L 15/1815* (2013.01); *G10L 15/22* (2013.01)

(58) Field of Classification Search
CPC ...... G10L 15/1815; G10L 15/22; G06F 40/35
See application file for complete search history.

(56) References Cited

U.S. PATENT DOCUMENTS

| 6,922,670 B2 * | 7/2005 | Yamada | ................. G06F 3/167 704/270.1 |
| 2002/0049805 A1 * | 4/2002 | Yamada | .............. H04M 3/4938 709/202 |

(Continued)

OTHER PUBLICATIONS

English Translation of International Preliminary Report on Patentability Chapter I for PCT/JP2019/023790, dated Apr. 6, 2021 (Year: 2021).*

(Continued)

*Primary Examiner* — Eric Yen

(57) ABSTRACT

A dialog apparatus and the like are provided which achieve a natural dialog in which topics minutely connect, starting from a user utterance, by making, after a robot's response to the user utterance, robots exchange additional questions and answers, which reflect the contents of the response, between them. A plurality of sets of four utterances, each set being made up of four sentences: an assumed user utterance sentence, a response sentence for user utterance, a subsequent utterance sentence for these sentences, and a subsequent response sentence as a unit, are stored, and, in response to input of text data corresponding to a user utterance, the dialog apparatus performs control such that any one of a plurality of agents utters, of a set of four utterances that begins with an assumed user utterance sentence which is similar to the text data corresponding to the user utterance, each of a response sentence for user utterance, a subsequent utterance sentence for these sentences, and a subsequent response sentence, different agents utter the response sentence for user utterance and the subsequent utterance sentence, and different agents utter the subsequent utterance sentence and the subsequent response sentence.

7 Claims, 8 Drawing Sheets

(56) References Cited

U.S. PATENT DOCUMENTS

| | | | |
|---|---|---|---|
| 2018/0090132 A1* | 3/2018 | Ikeno | G10L 15/1815 |
| 2019/0248001 A1* | 8/2019 | Kawamura | B25J 11/001 |
| 2020/0013404 A1* | 1/2020 | Sugiyama | G06F 3/01 |
| 2020/0065057 A1* | 2/2020 | Waki | G10L 13/00 |

OTHER PUBLICATIONS

Watanabe et al., "A touch display dialog system with an android in sales situation", the Japanese Society for Artificial Intelligence, The 30th Annual Conference of the Japanese Society for Artificial Intelligence, 2016 with translation generated by machine.

Sugiyama et al., "Avoiding dialogue breakdown through the coordination of multiple robots", the Japanese Society for Artificial Intelligence, The Annual Conference of the Japanese Society for Artificial Intelligence, pp. 1B2-OS-25b-2, 2017, with translation generated by machine.

Sugiyama, "Development of the world's first AI that conveys knowledge through chatting", NTT News Release, Jan. 31, 2018, Internet: <URL: http://www.ntt.co.jp/news2018/1801/180131b.html> with translation generated by machine.

Sugiyama et al., "Continuous conversation with two-robot coordination", the Japanese Society for Artificial Intelligence, The Annual Conference of the Japanese Society for Artificial Intelligence, May 22, 2018, Internet: <URL: https://www.ai-gakkai.or.jp/jsai2018/> with translation generated by machine.

* cited by examiner

| ASSUMED USER UTTERANCE SENTENCE | RESPONSE SENTENCE FOR USER UTTERANCE | SUBSEQUENT UTTERANCE SENTENCE | SUBSEQUENT RESPONSE SENTENCE |
|---|---|---|---|
| I LIKE THEM BECAUSE THEY HAVE LONG NOSES | ELEPHANTS CAN PICK UP SMALL OBJECTS WITH THEIR NOSES BECAUSE THEIR NOSES ARE COMPOSED OF MUSCLES | [QUESTION] DON'T THEY SUCK UP THE OBJECTS WITH THEIR NOSES? | THE TIPS OF THEIR NOSES ARE SEPARATED INTO PARTS LIKE FINGERS, AND THEY PICK UP THE OBJECTS WITH THESE PARTS |
| ELEPHANTS HAVE VERY LONG NOSES! | | [DECLARATIVE] THEY ARE VERY DEXTEROUS | THEY SAY YOU CAN UNDERSTAND HOW ELEPHANTS ARE FEELING BY OBSERVING THE MOVEMENTS OF THEIR NOSES |
| NOSES OF ELEPHANTS ARE VERY LONG | | [CONTINUATION] AND THEY SAY YOU CAN UNDERSTAND HOW ELEPHANTS ARE FEELING BY OBSERVING THE MOVEMENTS OF THEIR NOSES | IT IS AMAZING THAT WE CAN UNDERSTAND HOW ELEPHANTS ARE FEELING BY THEIR NOSES |
| ELEPHANTS ARE BIG AND COOL | THE ELEPHANT STANDS ABOUT 2.5 TO 3 METERS AT THE SHOULDER | [QUESTION] HOW LONG ARE THEIR NOSES? | THEIR NOSES ARE ABOUT 1.5 TO 2 METERS LONG |
| THE BODY IS BIG | | [DECLARATIVE] ELEPHANTS ARE SO BIG | THEY ARE POWERFUL WHEN SEEN AT CLOSE RANGE |
| SUPER BIG! | | [CONTINUATION] THEY ARE POWERFUL WHEN SEEN AT CLOSE RANGE | I WANT TO SEE THEM AT CLOSE RANGE |

FIG. 5

| QUESTION SENTENCE | CLASSIFICATION 1 | CLASSIFICATION 2 | CLASSIFICATION 3 | CLASSIFICATION 4 |
|---|---|---|---|---|
| WHY ARE THEIR NOSES SO LONG? | APPEARANCE | NOSE | LENGTH | REASON |
| WHY DO ELEPHANTS HAVE LONG NOSES? | APPEARANCE | NOSE | LENGTH | REASON |
| ... | ... | ... | ... | ... |
| HOW MUCH DO THEY WEIGH IN KILOS? | BIOLOGY | WEIGHT | | |
| HOW MUCH DO ELEPHANTS WEIGH? | BIOLOGY | WEIGHT | | |
| ... | ... | ... | ... | ... |
| HOW LARGE ARE THEY? | APPEARANCE | SIZE | | |
| HOW BIG ARE THEY? | APPEARANCE | SIZE | | |
| ... | ... | ... | ... | ... |

FIG. 6

DIALOG APPARATUS, METHOD AND PROGRAM FOR THE SAME

CROSS-REFERENCE TO RELATED APPLICATIONS

This application is a U.S. 371 Application of International Patent Application No. PCT/JP2019/023790, filed on 17 Jun. 2019, which application claims priority to and the benefit of JP Application No. 2018-189852, filed on 5 Oct. 2018, the disclosures of which are hereby incorporated herein by reference in their entireties.

TECHNICAL FIELD

This invention relates to a technology that allows a computer to have a dialog with a human using a natural language and that can be applied to a robot and the like which carry out communications with a human.

BACKGROUND ART

Recently, the research and development of robots which carry out communications with humans have progressed and dialog systems that allow robots and humans to have a dialog have been put to practical use in various fields. At present, in idle talk dialog systems that allow robots and humans to make idle talk, a high priority is given to the breadth of topic that can be addressed and a question-and-answer approach is mainly used for the exchange between robots and humans. By limiting the exchange between robots and humans to simple questions and answers, a wide range of topics can be addressed during idle talk. However, the problem is that questions and answers make a dialog fragmentary, which makes it difficult for a person (a user of the system), who is a dialog partner of a robot, to feel that he/she could have a coherent dialog with the robot and thereby experience a sense of satisfaction. To address this problem, a scenario including a plurality of turns may be constructed on the assumption that a topic transition by a user's utterance (hereinafter written as a user utterance) is not permitted or a very small number of branches are prepared (Non-patent Literature 1). In Non-patent Literature 1, when a topic transition is not permitted, the following flow is repeated: a robot questions a user, responds to an answer from the user by giving back-channel feedback such as "I see" irrespective of the user's answer, and replies "I am ○○". The problem of the approach of Non-patent Literature 1 is that a topic which comes next is not necessarily related directly to a user utterance, which makes it difficult to make a user, who is a dialog partner of a robot, feel that his/her answer was understood by the robot and thereby give a sense of satisfaction to the user. Moreover, there is another approach that makes a scenario branch in accordance with a user utterance; also in this case, however, the problem is that, since a user's utterance only has a slight influence on the course of conversation, the user gets only small satisfaction, not feeling that his/her answer was understood by the robot.

To address these problems, an approach is proposed which accumulates in advance a plurality of combinations of a question and an answer to the question as knowledge of utterance, makes a response to a user utterance based on the knowledge of utterance in the form of questions and answers, and allows two robots to have a dialog in the form of questions and answers between them by using another knowledge of utterance related to the contents of the response, and it is known that a user experiences a feeling that a dialog continues for a longer time than a one-to-one dialog conducted between one user and one robot (see Non-patent Literature 2).

PRIOR ART LITERATURE

Non-Patent Literature

Non-patent Literature 1: Miki Watanabe, Kohei Ogawa, Hiroshi Ishiguro, "A touch display dialog system with an android in sales situation", the Japanese Society for Artificial Intelligence, The 30th Annual Conference of the Japanese Society for Artificial Intelligence, 2016.

Non-patent Literature 2: Hiroaki Sugiyama, Toyomi Meguro, Yuichiro Yoshikawa, Junji Yamato, "Avoiding dialogue breakdown through the coordination of multiple robots", the Japanese Society for Artificial Intelligence, The Annual Conference of the Japanese Society for Artificial Intelligence, pp. 1B2-OS-25b-2, 2017.

SUMMARY OF THE INVENTION

Problems to be Solved by the Invention

However, since the knowledge of utterance of Non-patent Literature 2 is constructed of general contents rather than being tailored to a specific topic, the knowledge of utterance tends to have contents which do not match an individual topic or context of a dialog very much (contents which are not related to the details of a user utterance).

An object of the present invention is to provide a dialog apparatus, a method therefor, and a program that achieve a natural dialog in which topics minutely connect, starting from a user utterance, by making, after a robot's response to the user utterance, robots exchange additional questions and answers, which reflect the contents of the response, between them.

Means to Solve the Problems

To solve the above-described problem, according to an aspect of the present invention, a plurality of sets of four utterances, each set being made up of four sentences: an assumed user utterance sentence, a response sentence for user utterance, a subsequent utterance sentence for these sentences, and a subsequent response sentence as a unit, are stored, and, in response to input of text data corresponding to a user utterance, a dialog apparatus performs control such that any one of a plurality of agents utters, of a set of four utterances that begins with an assumed user utterance sentence which is similar to the text data corresponding to the user utterance, each of a response sentence for user utterance, a subsequent utterance sentence for these sentences, and a subsequent response sentence, different agents utter the response sentence for user utterance and the subsequent utterance sentence, and different agents utter the subsequent utterance sentence and the subsequent response sentence.

To solve the above-described problem, according to another aspect of the present invention, a plurality of sets of a plurality of utterances, each set including, at the beginning thereof, four sentences: an assumed user utterance sentence, a response sentence for user utterance, a subsequent utterance sentence for these sentences, and a subsequent response sentence, are stored, and, in response to input of text data corresponding to a user utterance, a dialog apparatus performs control such that any one of a plurality of agents utters, of a set of a plurality of utterances that begins with an assumed user utterance sentence which is similar to the text data corresponding to the user utterance, each of a response sentence for user utterance, a subsequent utterance sentence for these sentences, and a subsequent response sentence, different agents utter the response sentence for user utterance and the subsequent utterance sentence, and different agents utter the subsequent utterance sentence and the subsequent response sentence.

Effects of the Invention

According to the present invention, a natural dialog in which topics connect, starting from a user utterance, is achieved.

BRIEF DESCRIPTION OF THE DRAWINGS

FIG. 5 is a diagram showing examples of a set of four utterances.

FIG. 6 is a diagram showing an example in which a plurality of classifications are assigned to a question sentence.

DETAILED DESCRIPTION OF THE EMBODIMENTS

Figure 1:
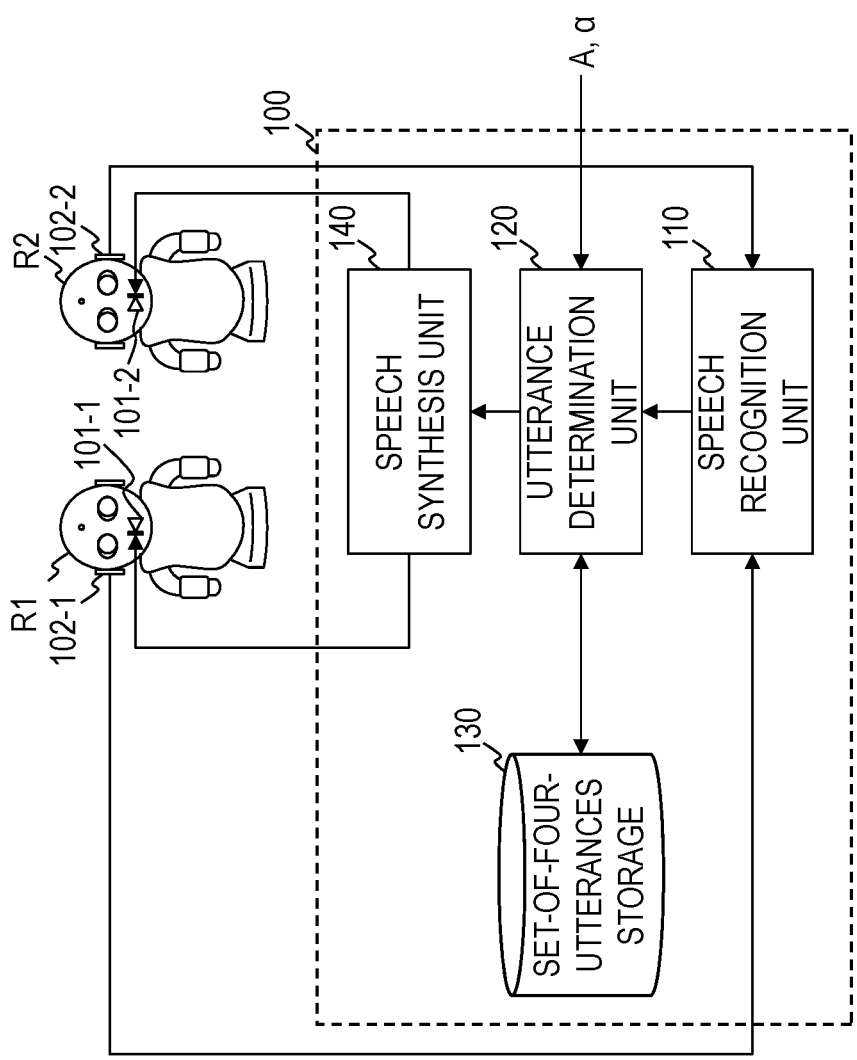
FIG. 1 is a functional block diagram of a dialog system according to a first embodiment.

Hereinafter, embodiments of the present invention will be described. It is to be noted that, in the drawings which are used in the following description, component elements having the same function and steps in which the same processing is performed are denoted by the same reference characters and overlapping explanations are omitted.

<Point of a First Embodiment>

In the present first embodiment, a multi-robot idle talk dialog system is proposed which is based on two exchanges of knowledge of utterance (a miniscenario), defining that, as a combination of a question and an answer and a scenario, one combination of a question and an answer corresponding to the question as one exchange of knowledge of utterance. Each miniscenario is made up of a sentence likely to be uttered by a user and three utterances that follow the sentence. On the assumption that a dialog between two or more robots and one user is conducted, a natural dialog is achieved in which topics minutely connect, starting from a user utterance, by making, after a robot's response to the user utterance, the robots exchange additional questions and answers, which reflect the contents of the response, between them. The point is that, since all of the responses to the user and the additional questions and answers are uttered by the robots, the responses and the additional questions and answers can be created in advance in such a way that they connect in a natural way as a dialog. Moreover, it is also possible to induce a topic in a natural way by using a dialog between the robots. This makes it possible to continue idle talk without causing the user to feel there is something strange even when the system has knowledge of utterance in a limited domain. Furthermore, in the present embodiment, it is also possible to implement the system that communicates knowledge while switching between idle talk and question and answer by constructing knowledge of utterance for idle talk, which is as detailed as that for question and answer and tailored to a narrow domain, by taking advantage of the above characteristics.

First Embodiment

Figure 2:
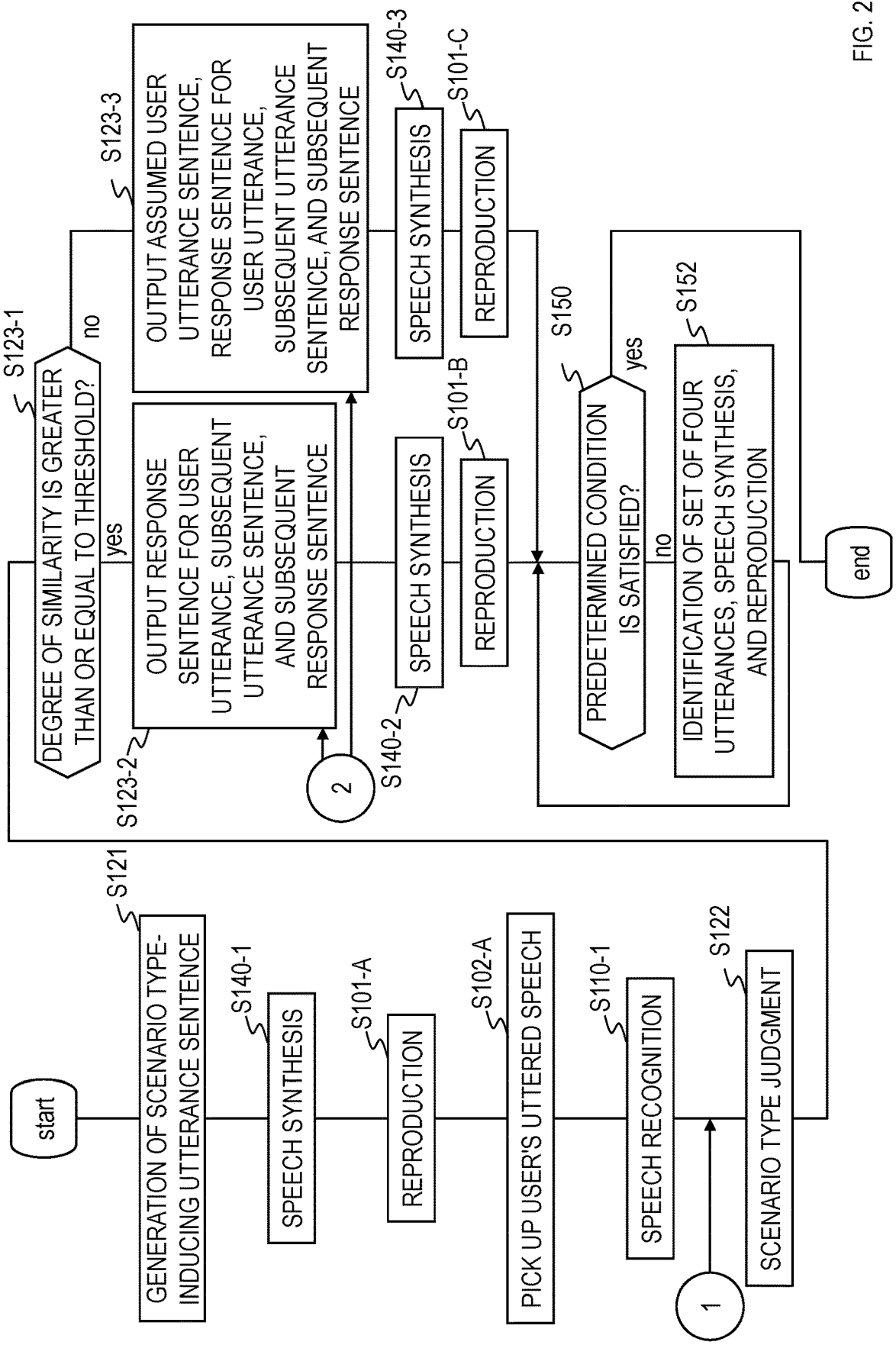
FIG. 2 is a diagram showing an example of a processing flow of the dialog system according to the first embodiment.

FIG. 1 shows a functional block diagram of a dialog system according to the first embodiment and FIG. 2 shows a processing flow of the dialog system.

The dialog system includes two robots R1 and R2 and a dialog apparatus 100. The robots R1 and R2 include input units 102-1 and 102-2 and presentation units 101-1 and 101-2, respectively. The dialog apparatus 100 includes a speech recognition unit 110, an utterance determination unit 120, a set-of-four-utterances storage 130, and a speech synthesis unit 140.

Figure 3:
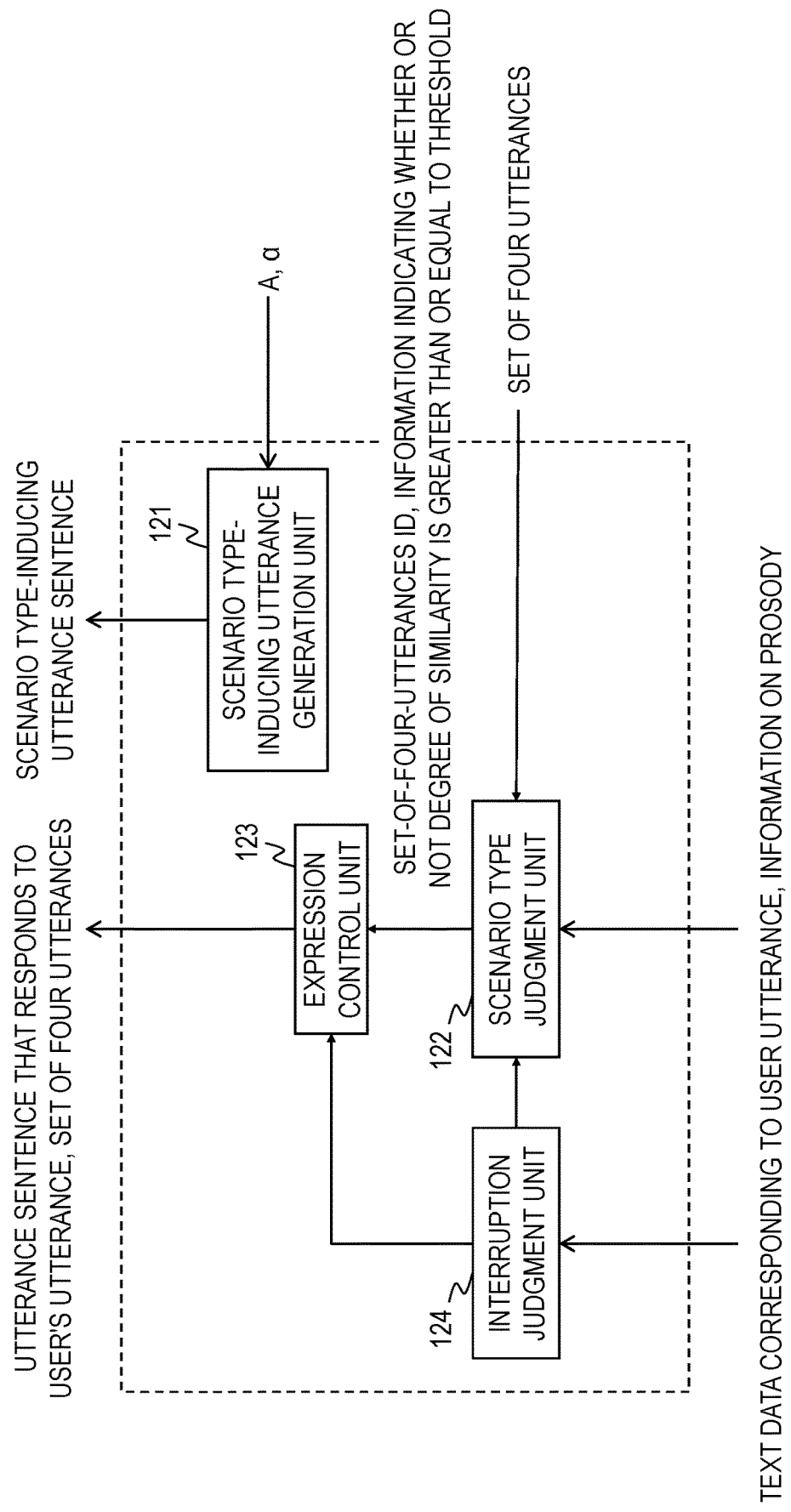
FIG. 3 is a functional block diagram of an utterance determination unit according to the first embodiment.

FIG. 3 shows a functional block diagram of the utterance determination unit 120 according to the first embodiment.

The utterance determination unit 120 includes a scenario type-inducing utterance generation unit 121, a scenario type judgment unit 122, an expression control unit 123, and an interruption judgment unit 124.

The dialog system allows a person, who is a user, to have a dialog with the robot R1 and the robot R2, which are two robots, and allows the robots R1 and R2 to utter synthetic speech, which was generated by the dialog apparatus 100, in response to an utterance of the person who is the user. Hereinafter, an operation of each unit of the dialog system will be described.

The dialog apparatus 100 picks up a user utterance via the input units 102-1 and 102-2, generates a dialogic sentence in response to the user utterance, and reproduces corresponding synthetic speech via the presentation units 101-1 and 101-2.

The dialog apparatus is a special apparatus configured as a result of a special program being read into a publicly known or dedicated computer including, for example, a central processing unit (CPU), a main storage unit (random access memory: RAM), and so forth. The dialog apparatus executes each processing under the control of the central processing unit, for example. The data input to the dialog apparatus and the data obtained by each processing are stored in the main storage unit, for example, and the data stored in the main storage unit is read into the central processing unit when necessary and used for other processing. At least part of each processing unit of the dialog apparatus may be configured with hardware such as an integrated circuit. Each storage of the dialog apparatus can be configured with, for example, a main storage unit such as random access memory (RAM) or middleware such as a relational database or a key-value store. It is to be noted that the dialog apparatus does not necessarily have to include each storage; each storage may be configured with an auxiliary storage unit configured with a hard disk, an optical disk, or a semiconductor memory device such as flash memory and provided outside the dialog apparatus.

<Robots R1 and R2>

The robot R1 and the robot R2 have a dialog with the user; the robot R1 and the robot R2 are placed near the user and make utterances generated by the dialog apparatus 100.

<Input Units 102-1 and 102-2>

The input units 102-1 and 102-2 pick up the uttered speech uttered by the user and output the picked up speech data to the speech recognition unit 110.

The input units 102-1 and 102-2 pick up sound signals produced around the robots and are microphones, for example. Since the input unit only has to be capable of picking up the uttered speech uttered by the user, a configuration including either one of the input units 102-1 and 102-2 may be adopted. Moreover, a configuration without the input units 102-1 and 102-2 may be adopted by using, as the input unit, a microphone installed in a place, such as a place near the user, different from a place where the robots R1 and R2 are placed.

<Presentation Units 101-1 and 101-2>

The presentation units 101-1 and 101-2 reproduce the speech corresponding to the synthetic speech data input from the speech synthesis unit 140. This allows the user to hear the utterance of the robot R1 or the robot R2, whereby a dialog between the user and the dialog system is achieved. The presentation units 101-1 and 101-2 produce sound signals around the robots R1 and R2 and are loudspeakers, for example.

Hereinafter, each unit of the dialog apparatus 100 will be described.

<Set-of-Four-Utterances Storage 130>

In the set-of-four-utterances storage 130, a plurality of sets of four utterances, each set being made up of four sentences: an assumed user utterance sentence, a response sentence for user utterance, a subsequent utterance sentence for these sentences, and a subsequent response sentence as a unit, are stored prior to a dialog. A generic name for the assumed user utterance sentence, the response sentence for user utterance, the subsequent utterance sentence for these sentences, and the subsequent response sentence is an utterance sentence. Here, the response sentence for user utterance, the subsequent utterance sentence for these sentences, and the subsequent response sentence are text data, for example. The assumed user utterance sentence may be made up only of text data, may be stored with information obtained by dividing the assumed user utterance sentence into words, may be associated with a vector, to which the assumed user utterance sentence was converted and which represents the contents of the assumed user utterance sentence, and stored, or may be associated with speech synthesis data obtained by performing speech synthesis on the text data and stored, or information corresponding to the text data and speech data may be associated with each other and stored. It is to be noted that the speech data here may be synthetic speech data obtained by performing speech synthesis on the text data or may be speech data itself obtained by recording the text data read by a person or speech data obtained by editing the recorded speech data. It is to be noted that, when speech data corresponding to text data is stored in the set-of-four-utterances storage 130, the speech synthesis unit is not necessary. Each set of four utterances is associated with information (a set-of-four-utterances ID), by which each set of four utterances can be identified, and stored in the set-of-four-utterances storage 130. As another example, the response sentence for user utterance, the subsequent utterance sentence for these sentences, and the subsequent response sentence may be vectors to which the sentences were converted and which represent the contents of the sentences.

(Set of Four Utterances)

First, a miniscenario (a set of four utterances) will be described.

Assume that H is a user and R1 and R2 are partners (robots) to which the user makes an utterance. The following description will be given on the assumption that a dialog with a child about an animal is conducted. The robot is a device that outputs speech and text. The following description will be given on the assumption that, as described earlier, there are two robots; however, the number of robots is not limited to two as long as there are two or more robots. As in the present embodiment, a signal obtained by performing speech synthesis on the contents of an utterance may be output via the presentation unit using a loudspeaker or the like built into the robot, or, as another embodiment, a text sentence indicating the contents of an utterance may be displayed in a balloon from a chatbot using a smartphone or the like without performing speech synthesis (see FIG. 4). In addition thereto, a loudspeaker may be built into a stuffed toy such that a signal obtained by performing speech synthesis on the contents of an utterance is output therefrom. The contents of an utterance may be simply displayed using text in the form of, for example, a text chat. In the present specification, hardware which is a dialog partner of the user, such as a robot or a chat partner of a chatbot or the like, computer software for making a computer function as hardware which is a dialog partner of the user, and so forth are generically called an agent. Since the agent is a dialog partner of the user, the agent may be anthropomorphized, personalized, or have a character or personality like a robot, a chat partner, or the like. An agent which the user easily recognizes as a dialog partner is desirable; therefore, the following description will be given using an example in which a signal obtained by performing speech synthesis on the contents of an utterance is output using a loudspeaker or the like built into a robot. t(v) means a v-th utterance and X→Y means that X makes an utterance to Y.

EXAMPLE t(1): R1→H: What do you like about elephants?
(which corresponds to a scenario type-inducing utterance sentence, which will be described later)
t(2): H→R1: I like them because they are big
(Based on this utterance t(2), a scenario type is determined and a set of four utterances including an assumed user utterance sentence (a first utterance of a set of four utterances) which is most closely similar to the utterance t(2) is identified)
t(3): R1→H: I see
(The utterance t(3) is not indispensable. This utterance t(3) is an utterance for bringing a heightened sense of conviction to the user and is an utterance that responds to the user utterance)
t(4): R2→H: Elephants are big and cool
(The utterance t(4) is not indispensable. This utterance t(4) is an utterance for bringing a heightened sense of conviction and is an utterance that responds to the user utterance. This utterance t(4) includes a phrase "big" corresponding to "big" included in the utterance t(2) which is the user utterance, and is also called a rephrase utterance. Here, a robot that utters the utterance t(4) is preferably a robot that is different from a robot that uttered the utterance t(3) that is the first utterance that responds to the user utterance)
t(5): R1→R2: The elephant stands about 2.5 to 3 meters at the shoulder (This is a second utterance of the set of four utterances. Here, a robot that utters the second utterance is preferably a robot that is different from a robot that uttered the utterance immediately before. Since the second utterance of the set of four utterances is assumed to be a response to the first utterance, it is preferable that a robot which is different from a robot that uttered a rephrase in the utterance t(4): R2→H utters the second utterance. When there are three or more robots, a robot that makes the second utterance does not have to be the robot R1 as long as the robot is a robot that is different from a robot that uttered a rephrase in the utterance t(4): R2→H. Although a description of a case where there are three or more robots is omitted, a way of thinking in a case where a robot that utters the second utterance is made different from a robot that uttered the utterance immediately before is the same)

t(6): R2→R1: Elephants are so big
(A third utterance of the set of four utterances. In this example, a robot that utters the third utterance is a robot that is different from a robot that uttered the second utterance)
t(7): R1→R2: They are powerful when seen at close range
(A fourth utterance of the set of four utterances. A robot that utters the fourth utterance is a robot that is different from a robot that uttered the third utterance.)

(Details of the Set-of-Four-Utterances Storage 130)

For use in a search which will be described later, as described above, the assumed user utterance sentence stored in the set-of-four-utterances storage 130 may be stored as information obtained by dividing the assumed user utterance sentence into words or may be associated with a vector, to which the assumed user utterance sentence was converted and which represents the contents of the assumed user utterance sentence, and stored.

Based on an example in which it is assumed that a dialog about an animal is conducted, an explanation and a construction method of the assumed user utterance sentence, the response sentence for user utterance, the subsequent utterance sentence for these sentences, and the subsequent response sentence will be described below.

The assumed user utterance sentence is a sentence that is assumed to be uttered by the user, and a large number of assumed user utterance sentences are created so that the user utterance range can be minutely covered. In the present embodiment, a plurality of utterance sentences about an animal, which is an object, are created for each of utterance types including good points, questions, and trivia. For example, fifty utterance sentences are created for each type. The utterance sentences are created by hand in advance. One or more utterance sentences will suffice; the more utterance sentences are created, the wider the range of topic variations can be made. FIG. 5 shows examples of a set of four utterances whose object is an "elephant" and whose type is "good points". For example, The utterance sentences about the type "good points" of the object "elephant" are "I like them because they have long noses", "Elephants are big and cool", and the like.

The utterance sentences about the type "questions" of the object "elephant" are "Why are their noses so long?", "How much do they weigh in kilos?", and the like.

The utterance sentences about the type "trivia" of the object "elephant" are "Elephants get sunburned like us.", "Elephants can swim.", and the like.

Furthermore, to tolerate variations in the expression of a user utterance, a plurality of sentences, for example, five sentences, each using an expression different from that of each assumed user utterance sentence, which have the same meaning as the assumed user utterance sentence are created. For instance, examples of a sentence having the same meaning as "I like them because they have long noses" using an expression different from that of "I like them because they have long noses" include "Elephants have long noses." and "Elephants have very long noses!". It is to be noted that preferably there are about 25 to 30 types of utterance sentences, each including a plurality of utterance sentences having the same meaning.

Next, for the assumed user utterance sentences created in the above-described manner, response sentences for user utterance, which are uttered by the robots, are created. To prevent a contradiction between robot's utterances, it is assumed that the response sentence for user utterance is created for each type of animal and the same response sentence for user utterance is created for assumed user utterance sentences having the same meaning. Moreover, if response sentences for user utterance include a question, it becomes difficult to maintain consistency between the response sentence for user utterance and the subsequent utterance sentence, which will be described later; therefore, it is assumed that the response sentence for user utterance is created in a declarative sentence form. As a response sentence for an utterance sentence about elephants "I like them because they have long noses", a response sentence such as "Elephants can pick up small objects with their noses because their noses are composed of muscles" is created.

The subsequent utterance sentence is an utterance created for a pair of an assumed user utterance sentence and a response sentence for user utterance, which are associated with the subsequent utterance sentence, such that the subsequent utterance sentence follows these sentences in a natural way as a dialog. For example, the subsequent utterance sentence is an utterance created so as to be judged to have topic continuity, based on the magnitude relationship between an index indicating topic continuity and a predetermined threshold, for a pair of an assumed user utterance sentence and a response sentence for user utterance which are associated with the subsequent utterance sentence. There are various possible methods as a method of making a judgment whether or not there is topic continuity; for example, a judgment whether or not there is topic continuity is made by the following two methods.

1. An index indicating topic continuity is defined as the distance between sentence vectors generated by word2vec, and it is judged that topics connect (there is topic continuity and topics connect in a natural way) if the distance is less than a predetermined threshold or is less than or equal to the predetermined threshold.

2. It is judged that topics connect (there is topic continuity and topics connect in a natural way) if a breakdown is not detected using the breakdown detection technique of Reference Literature 1.

(Reference Literature 1) Hiroaki Sugiyama, "Dialogue Breakdown Detection based on Estimating Appropriateness of Topic Transition", Dialogue System Technology Challenge, 2016.

In this example, as the subsequent utterance sentence, utterances of three types, question, declarative, and continuation, are created. Here, these types are set independently of the types of assumed user utterance sentence. Question and declarative are created on the assumption that an utterer different from the utterer of the response sentence for user utterance utters them, and continuation is created on the assumption that the utterer of the response sentence for user utterance utters it continuously. For example, as subsequent utterance sentences for the response sentence for user utterance "Elephants can pick up small objects with their noses because their noses are composed of muscles", the type "question": "Don't they suck up the objects with their noses?",
the type "declarative": "They are very dexterous",
type "continuation": "And they say you can understand how elephants are feeling by observing the movements of their noses", and so forth are created.

The subsequent response sentence is an utterance created so as to be a natural response to the subsequent utterance sentence, and is created in a manner similar to the way the response sentence for user utterance is created. For example, the subsequent response sentence is an utterance created so as to be judged to have topic continuity, based on the magnitude relationship between an index indicating topic continuity and a predetermined threshold, for the subsequent utterance sentence. As a method of making a judgment whether or not there is topic continuity, a method similar to the above-mentioned method described in connection with the subsequent utterance sentence can be used.

By configuring the knowledge of utterance in the manner described above, the subsequent utterance sentence is created as an utterance closely connecting to the assumed user utterance sentence and the response sentence for user utterance which were uttered before the subsequent utterance sentence, which makes it possible to achieve a natural dialog compared to when a plurality of turns are obtained by connecting questions and answers.

<Utterance Determination Unit 120>

As described earlier, the utterance determination unit 120 includes the scenario type-inducing utterance generation unit 121, the scenario type judgment unit 122, the expression control unit 123, and the interruption judgment unit 124 (see FIG. 3).

(Scenario Type-Inducing Utterance Generation Unit 121)
Input: an object A, a type α
Output: text data representing a scenario type-inducing utterance sentence The scenario type-inducing utterance generation unit 121 generates, using a template utterance, which is associated with a type α, and an object A as input, a scenario type-inducing utterance sentence from the template utterance, which is associated with the type α, and the object A (S121) and outputs the scenario type-inducing utterance sentence to the speech synthesis unit 140. Here, the scenario type-inducing utterance sentence is an "utterance sentence encouraging an utterance of the type α about the object A" (such as text data).

The object A is information indicating an object of the contents of an utterance. For example, when conversation about an animal is made in a zoo, the object A can be the type of animal, for example. In this example, a description will be given using an elephant as the object A.

The type α is information indicating that which defines the type of contents of an utterance. In this example, a description will be given by taking six types, good points, questions, trivia, dislikes, praise for a robot, and speaking ill of a robot, as an example of the type of contents of an utterance.

Examples of the good points type are likes about the object A. For example, a scenario type-inducing utterance sentence like "What do you like about the <object A>?" is generated.

Examples of the questions type are questions about the object A. For example, a scenario type-inducing utterance sentence like "Do you have any question about the <object A>?" is generated.

Examples of the trivia type are knowledge about the object A, which is relatively unknown to the general public. For example, a scenario type-inducing utterance sentence like "The <object A> has a conversation using sound that is inaudible to humans." is generated.

Examples of the dislikes type are dislikes about the object A. For example, a scenario type-inducing utterance sentence like "What do you dislike about the <object A>?" is generated.

Examples of the praise-for-robot type are good points of a robot irrespective of the object A. For example, a scenario type-inducing utterance sentence like "What do you like about me?" is generated. In this case, the object A is not necessary.

Examples of the speaking-ill-of-robot type are bad points of a robot irrespective of the object A. For example, a scenario type-inducing utterance sentence like "What do you dislike about me?" is generated. In this case, the object A is not necessary.

A plurality of sentences, which are utterances encouraging an utterance of every type except for "the praise-for-robot type" and "the speaking-ill-of-robot type", are associated with each type and stored in an unillustrated storage in the form of a template utterance in which the object A, which is the subject, will be filled. For example, a sentence may be selected in the following manner from a plurality of sentences associated with each type.

At the execution of the first processing, the scenario type-inducing utterance generation unit 121 randomly selects one sentence from a plurality of utterance sentences associated with the type α based on input of the object A and the type α, generates a scenario type-inducing utterance sentence in which the subject is the object A and outputs the scenario type-inducing utterance sentence, and marks the used utterance sentence with a flag. This flag indicates that the corresponding utterance sentence has already been selected.

At the execution of the second processing, the scenario type-inducing utterance generation unit 121 randomly selects an unselected utterance sentence without a flag from the plurality of utterance sentences associated with the type α, generates a scenario type-inducing utterance sentence in which the subject is the object A, and outputs the scenario type-inducing utterance sentence.

This configuration makes it possible to prevent the same scenario type-inducing utterance sentence from being successively selected.

The following is an example of how the object A and the type α are input.

For example, the user is allowed to select an object and a type using a touch panel and, when the user taps any object and any type, the scenario type-inducing utterance generation unit 121 receives, from the touch panel, information indicating the object A and information indicating the type α.

Moreover, for example, a configuration may be adopted in which a plurality of objects and a plurality of types are prepared in advance and, when information indicating an instruction to start a new scenario is received from an unillustrated control unit, an object and a type are randomly selected from the plurality of objects and the plurality of types. In this case, the scenario type-inducing utterance generation unit 121 uses, as input, information indicating the start of a new scenario.

<Speech Synthesis Unit 140>

The speech synthesis unit 140 receives the scenario type-inducing utterance sentence as input, obtains synthetic speech data by performing speech synthesis on the scenario type-inducing utterance sentence (S140-1), and outputs the obtained synthetic speech data to the presentation unit 101-1 of the robot R1 or the presentation unit 101-2 of the robot R2. Here, the speech synthesis unit 140 converts the text data, which was determined by the utterance determination unit 120 and represents the contents of an utterance, to a speech signal representing the contents of an utterance. The speech signal representing the contents of an utterance is input to the presentation unit 101-1 or 101-2. Any existing speech synthesis technology may be used as a speech synthesis method, and an optimum method only has to be appropriately chosen in accordance with a use environment and the like.

The presentation unit 101-1 or 101-2 receives the synthetic speech data and reproduces corresponding speech (S101-A).

It is to be noted that, in the following description, processing to generate some text data, perform speech synthesis on the text data, and reproduce corresponding speech is simply referred to as making the robot R1 or the robot R2 utter.

The input unit 102-1 or 102-2 picks up the user's uttered speech immediately after output of the scenario type-inducing utterance sentence (S102-A) and outputs the picked up speech data (the pickup signal) to the speech recognition unit 110.

<Speech Recognition Unit 110>

The speech recognition unit 110 receives the pickup signal as input, performs speech recognition on the pickup signal (S110-1), and outputs the speech recognition result to the scenario type judgment unit 122. The speech recognition result includes, for example, corresponding text data and information on prosody. Here, at all times, the speech recognition unit 110 converts the speech signal of the user's uttered speech picked up by the input unit 102-1 or 102-2 to text data representing the contents of the user's utterance and outputs the text data representing the contents of the user's utterance to the utterance determination unit 120. Any existing speech recognition technology may be used as a speech recognition method, and an optimum method only has to be appropriately chosen in accordance with a use environment and the like.

(Scenario Type Judgment Unit 122)

Input: the text data corresponding to the user utterance, the information on prosody, a set of four utterances stored in the set-of-four-utterances storage 130

Output: a set-of-four-utterances ID, information indicating whether or not the degree of similarity is greater than or equal to a threshold The scenario type judgment unit 122 receives, as input, the text data corresponding to the user utterance and the information on prosody and judges whether or not the user utterance sentence is a question sentence by using them. A judgment whether or not the user utterance sentence is a question sentence is made using the text data corresponding to the user utterance and the prosody of speech. For example, it can be judged that the user utterance sentence is a question sentence if the user utterance sentence includes an interrogative like "what" or "where" or the sentence in Japanese is ended with a postpositional particle indicating a question like "ka" in "Sukidesuka?" ("Do you like it?"). Moreover, it can be judged whether or not the user utterance sentence is a question more accurately by using the prosodic information of speech when whether or not the user utterance sentence is a question depends on the rising or falling end intonation of the sentence in Japanese as in the case of "Sukinano" ("Do you like it?" or "I like it"). These may be described as a rule or may be automatically recognized by machine learning from a question utterance corpus (see Reference Literature 2).

(Reference Literature 2) Toyomi Meguro, Ryuichiro Higashinaka, Hiroaki Sugiyama, Yasuhiro Minami, "Dialogue act tagging for microblog utterances using semantic category patterns", Information Processing Society of Japan, 2013, IPSJ SIG Technical Report (SLP), 2013(1), 1-6.

If the scenario type judgment unit 122 judges that the user utterance sentence is a question sentence, the scenario type judgment unit 122 retrieves, from the set-of-four-utterances storage 130, a set-of-four-utterances ID corresponding to an assumed user utterance sentence included in a set of four utterances of the question type, calculates the degree of similarity between the assumed user utterance sentence and the text data corresponding to the user utterance (S122), and outputs a set-of-four-utterances ID of a set of four utterances including an assumed user utterance sentence which is most closely similar to the text data corresponding to the user utterance and information indicating whether or not the degree of similarity is greater than or equal to a threshold.

If the scenario type judgment unit 122 judges that the user utterance sentence is not a question sentence, the scenario type judgment unit 122 retrieves, from the set-of-four-utterances storage 130, a set-of-four-utterances ID corresponding to an assumed user utterance sentence included in each of all the sets of four utterances other than those of the question type, calculates the degree of similarity between the assumed user utterance sentence and the text data corresponding to the user utterance (S122), and outputs a set-of-four-utterances ID of a set of four utterances including an assumed user utterance sentence which is most closely similar to the text data corresponding to the user utterance and information indicating whether or not the degree of similarity is greater than or equal to a threshold.

When the scenario type-inducing utterance sentence is an utterance that induces a user utterance corresponding to a particular scenario type, a configuration may be adopted in which the object A and the type $\alpha$ are used as input to the scenario type judgment unit 122 and the degree of similarity between an assumed user utterance sentence included in a set of four utterances of the induced scenario type and the text data corresponding to the user utterance is calculated. For example, when the scenario type-inducing utterance sentence is an utterance that elicits good points of an object, such as "What do you like about elephants?", it is only necessary to calculate the degree of similarity between an assumed user utterance sentence included in a set of four utterances of "good points" and the text data corresponding to the user utterance, and a judgment whether or not the user utterance is a question sentence may be omitted.

For example, the degree of similarity between words is obtained using word2vec and the averaging or the like of the degrees of similarity is used as the degree of inter-sentence similarity between an assumed user utterance sentence and the text data corresponding to the user utterance. It is to be noted that a method using word2vec is an example and the method is not limited thereto as long as the method is a technique that can be used for similarity degree judgment. For example, a model that outputs the degree of inter-sentence similarity by using a neural network using a natural sentence corpus as input may be learned in advance, and the scenario type judgment unit 122 may obtain the degree of inter-sentence similarity using the learned model.

It is to be noted that the present embodiment is an example; the degree of similarity between an assumed user utterance sentence included in each of all the sets of four utterances, irrespective of whether it is a question sentence or not, and the text data corresponding to the user utterance may be calculated and a set-of-four-utterances ID of a set of four utterances including an assumed user utterance sentence which is most closely similar to the text data corresponding to the user utterance and information indicating whether or not the degree of similarity is greater than or equal to a threshold may be output.

(Expression Control Unit 123)

Input: the set-of-four-utterances ID, the information indicating whether or not the degree of similarity is greater than or equal to the threshold Output: an utterance sentence that responds to the user's utterance, a set of four utterances If the degree of similarity is greater than or equal to the threshold (yes in S123-1), the expression control unit 123 outputs, to the speech synthesis unit 140, text data corresponding to an utterance sentence that responds to the user utterance and a response sentence for user utterance, a subsequent utterance sentence, and a subsequent response sentence which correspond to the received set-of-four-utterances ID (S123-2).

If the degree of similarity is less than the threshold (no in S123-1), the expression control unit 123 outputs, to the speech synthesis unit 140, text data corresponding to an utterance sentence that responds to the user utterance and an assumed user utterance sentence, a response sentence for user utterance, a subsequent utterance sentence, and a subsequent response sentence which correspond to the received set-of-four-utterances ID (S123-3).

Hereinafter, a specific description will be given.

(1) If the Degree of Similarity is Greater than or Equal to the Threshold

An utterance that responds to the user utterance, such as R1→H: I see (a first example of an utterance that responds to the user utterance)

R2→H: Elephants are big and cool (a second example of an utterance that responds to the user utterance) is made.

The first examples of an utterance that responds to the user utterance include utterances without a content word, such as "Hmm", "Uh-huh", and "Oh".

Moreover, the second examples of an utterance that responds to the user utterance include an utterance that repeats the user's utterance and an utterance obtained by rephrasing the user's utterance. For example, "Yeah, (the user's utterance is quoted here)".

As an utterance that responds to the user utterance, both of the first and second examples described above may be uttered, either one of the first and second examples may be uttered, or no utterance may be made. In this regard, however, making an utterance brings a heightened sense of satisfaction to the user.

After the above-described utterance that responds to the user utterance, a plurality of robots utter, in turns, the three utterance sentences (the response sentence for user utterance, the subsequent utterance sentence, and the subsequent response sentence) following the assumed user utterance sentence of the set of four utterances.

(2) If the Degree of Similarity is Less than the Threshold

An utterance that responds to the user utterance, such as R1→H: I see
is made.

The examples of an utterance that responds to the user utterance include utterances without a content word, such as "Hmm", "Uh-huh", and "Oh" (such as text data). In this case, an utterance that responds to the user utterance is made without exception.

After the above-described utterance, a plurality of robots utter, in turns, the four utterances (the assumed user utterance sentence, the response sentence for user utterance, the subsequent utterance sentence, and the subsequent response sentence) of the set of four utterances. Inserting topic change words such as "That reminds me" before the assumed user utterance sentence makes the dialog more natural; therefore, if the degree of similarity is less than the threshold, the expression control unit 123 may output an utterance that responds to the user utterance, topic change words, the assumed user utterance sentence, the response sentence for user utterance, the subsequent utterance sentence, and the subsequent response sentence.

The bottom line is that, if the degree of similarity is greater than or equal to the threshold, a direct response to the user utterance can be made using the response sentence for user utterance; if the degree of similarity is less than the threshold, the system continues the dialog by changing the topic using an inter-robot dialog because the response sentence for user utterance cannot be used as an appropriate response.

(When a Plurality of Subsequent Utterance Sentences Correspond to One Response Sentence for User Utterance)

A plurality of subsequent utterance sentences may be prepared for a certain response sentence for user utterance (see FIG. 5). In this case, a subsequent utterance sentence may be randomly selected from the plurality of subsequent utterance sentences and expressed. For example, as described earlier, since the expression control unit 123 uses the set-of-four-utterances ID as input, the expression control unit 123 randomly selects one subsequent utterance sentence from a plurality of subsequent utterance sentences that correspond to a response sentence for user utterance of a set of four utterances corresponding to the input set-of-four-utterances ID and a set of four utterances having the same response sentence for user utterance as the response sentence for user utterance of the set of four utterances corresponding to the input set-of-four-utterances ID and expresses the one subsequent utterance sentence.

Moreover, a plurality of subsequent utterance sentences that are classified into "question", "declarative", and "continuation" may be prepared for a certain response sentence for user utterance.

For example, for a dialog:
A scenario type-inducing utterance sentence: R1→H: What do you like about elephants?
A user utterance: H→R1: I like them because they are big
A response sentence for user utterance: R1→R2: The elephant stands about 2.5 to 3 meters at the shoulder,
the following subsequent utterance sentences that are classified into "question", "declarative", and "continuation" are prepared.
An example of a subsequent utterance sentence of "question": R2→R1:
How long are their noses?
An example of a subsequent utterance sentence of "declarative": R2→R1: Elephants are so big
An example of a subsequent utterance sentence of "continuation": R1→R2: They are powerful when seen at close range
Furthermore, a plurality of subsequent utterance sentences may be prepared for each of "question", "declarative", and "continuation".

In this case, the expression control unit 123 selects, as a subsequent utterance sentence after the response sentence for user utterance, one of a plurality of subsequent utterance sentences that are classified into "question", "declarative", and "continuation" and expresses the selected subsequent utterance sentence.

"Question" is a question that properly matches the contents of the response sentence for user utterance, and is uttered by a robot that did not utter the response sentence for user utterance.

"Declarative" is a declarative sentence, such as feedback, which properly matches the contents of the response sentence for user utterance, and is uttered by a robot that did not utter the response sentence for user utterance.

"Continuation" is a declarative sentence, such as additional information, which properly matches the contents of the response sentence for user utterance, and is continuously uttered by a robot that uttered the response sentence for user utterance.

Since one subsequent utterance sentence is randomly selected from a plurality of subsequent utterance sentences that are classified into "question", "declarative", and "continuation", this dialog system includes a case where different agents utter the response sentence for user utterance and the subsequent utterance sentence (a case where subsequent utterance sentences that are classified into "question" and "declarative" are selected) and a case where the same agent utters the response sentence for user utterance and the subsequent utterance sentence (a case where a subsequent utterance sentence that is classified as "continuation" is selected).

(Selection Based on Preferences of the User)

The expression control unit 123 may judge, based on the course of the dialog, the classification of a subsequent utterance sentence which the user prefers and select a subsequent utterance sentence such that a subsequent utterance sentence which the user prefers is easily expressed.

For example, a configuration may be adopted in which a weighted selection is made from "question", "declarative", and "continuation" depending on whether or not the user likes being asked questions. As a method of judging whether or not the user likes being asked questions, for example, a method of taking pictures of the line of sight, facial expressions, posture, and the like of the user, who has observed the utterances made between the robots, separately with an imaging device and estimating the degree of interest of the user from the taken pictures can be used. The expression control unit 123 judges that the user likes being asked questions if it is estimated that the user "has an interest" from the line of sight, facial expressions, posture, and the like of the user who has just been asked a question.

When the user likes being asked questions, weighting is implemented such that, when a selection is randomly made from "question", "declarative", and "continuation", the probability "question" will be selected is made higher than the probability "declarative" will be selected and the probability "continuation" will be selected.

Furthermore, a search should be conducted in such a way that the used set of four utterances (the ID and the pattern of each of sentences of "question", "declarative", and "continuation") is marked with a flag so as not to be used in the second and subsequent search. For example, as shown in FIG. 6, it is only necessary to assign a plurality of classifications to each question sentence such that a sentence with the same combination of classifications is not selected in the second and subsequent search. For example, flags only have to be reset at each user change or when all the flags are set.

(1) When the Degree of Similarity is Greater than or Equal to the Threshold

The speech synthesis unit 140 receives, as input, the utterance sentence that responds to the user's utterance and the response sentence for user utterance, the subsequent utterance sentence, and the subsequent response sentence of the set of four utterances, which are output from the expression control unit 123, performs speech synthesis on these pieces of text data (S140-2) and obtains synthetic speech data, and outputs the obtained synthetic speech data to the presentation unit 101-1 of the robot R1 or the presentation unit 101-2 of the robot R2.

The presentation unit 101-1 or 101-2 receives, as input, the synthetic speech data which is output from the speech synthesis unit 140, and reproduces corresponding speech in a sequential order (S101-B).

(2) When the Degree of Similarity is Less than the Threshold

The speech synthesis unit 140 receives, as input, the utterance sentence that responds to the user's utterance and the assumed user utterance sentence, the response sentence for user utterance, the subsequent utterance sentence, and the subsequent response sentence of the set of four utterances, which are output from the expression control unit 123, performs speech synthesis on these pieces of text data (S140-3) and obtains synthetic speech data, and outputs the obtained synthetic speech data to the presentation unit 101-1 of the robot R1 or the presentation unit 101-2 of the robot R2.

The presentation unit 101-1 or 101-2 receives, as input, the synthetic speech data which is output from the speech synthesis unit 140, and reproduces corresponding speech in a sequential order (S101-C).

If a predetermined condition is satisfied (yes in S150), the dialog is ended; if the predetermined condition is not satisfied (no in S150), the following processing is performed.

When the robots finish uttering the set of four utterances and the user does not interrupt the dialog, a set of four utterances which the robots are made to utter next is identified, speech synthesis is performed in the speech synthesis unit 140, and presentation is made in the presentation unit 101-1 or 101-2 (S152). For example, an utterance sentence which is similar to the last utterance made by the robot is retrieved from the set-of-four-utterances storage 130, and a set of four utterances associated with the utterance sentence is made between the robots.

It is to be noted that another utterance sentence (set of four utterances ID), which is similar to the last utterance made by the robot, in the set-of-four-utterances storage 130 may be set in advance, such that the set of four utterances, which was set in advance, is uttered without being retrieved therefrom each time.

Examples of the predetermined condition can include when the number of user's utterances reaches a predetermined number and when the elapsed time exceeds a predetermined time.

<Interruption Judgment Unit 124>

Figure 7:
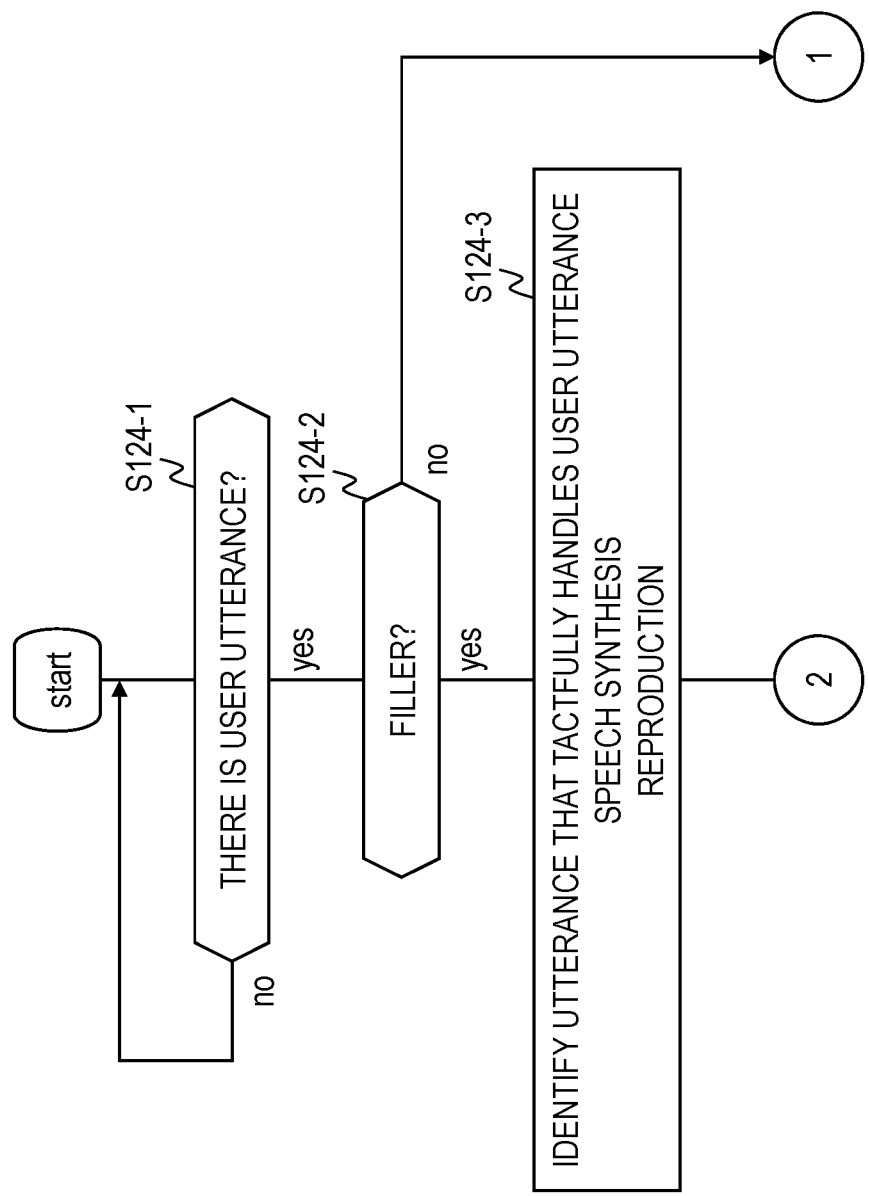
FIG. 7 is a diagram showing an example of a processing flow of an interruption judgment unit.

Input: the text data corresponding to the user utterance, the information on the prosody of the user utterance Output: the text data corresponding to the user utterance and the information on the prosody of the user utterance, or an utterance that tactfully handles the user utterance FIG. 7 shows an example of a processing flow of the interruption judgment unit 124.

The interruption judgment unit 124 is ready at all times to judge whether there is an interruption by a user utterance by using the text data corresponding to the user utterance and the information on prosody.

If there is a user utterance (S124-1), the interruption judgment unit 124 judges whether or not the user utterance is a filler (S124-2). As in the case of a question judgment, an example of a method of judging whether or not the user utterance is a filler is performed using a character string or the prosody of speech. It is to be noted that, since there are types of fillers such as back-channel feedback, agreement, and disagreement, a configuration may be adopted in which utterance sentences representing these types are collected, a classifier is created from these utterance sentences by machine learning, and a judgment whether or not the user utterance is a filler is made by the classifier.

If the user utterance is not a filler, the interruption judgment unit 124 outputs the text data corresponding to the user utterance and the information on the prosody thereof to the scenario type judgment unit 122 (no in S124-2).

If the user utterance is a filler, the interruption judgment unit 124 outputs, to the expression control unit 123, an utterance that tactfully handles the user utterance and returns to a state in which the interruption judgment unit 124 is ready to make a judgment whether there is an interruption by a user utterance. Examples of an utterance that tactfully handles the user utterance include "That's right" and "Um" (such as text data). An utterance may be changed depending on the type of filler; for example, "Yes" if the type of filler is back-channel feedback, "Yeah" if the type of filler is agreement, and "Hmm" if the type of filler is disagreement. In the present embodiment, it is assumed that the filler is used in the middle of a set of four utterances. For example, the expression control unit 123 outputs, to the speech synthesis unit 140, the input utterance that tactfully handles the user utterance and returns to the set of four utterances that is currently expressed (yes in S124-2). The speech synthesis unit 140 obtains synthetic speech data by performing speech synthesis on the input utterance that tactfully handles the user utterance, and outputs the obtained synthetic speech data to the presentation unit 101-1 of the robot R1 or the presentation unit 101-2 of the robot R2. The presentation unit 101-1 or 101-2 receives, as input, the synthetic speech data corresponding to the utterance that tactfully handles the user utterance, and reproduces corresponding speech (S124-3).

<Effect>

The above configuration makes it possible to achieve a natural dialog in which topics minutely connect, starting from a user utterance.

<Simulation Results>

(Experimental Settings)

A demonstration experiment in which the dialog system of the present embodiment was installed in a zoo and had a dialog with visitors for one month was conducted. The experiment was conducted in a free area of the zoo. The free area is a space where mainly a parent and a child have meals or take a rest while reading a book, and many visitors visit there on holidays, in particular. In this experiment, the aim is to evaluate the actual user's level of satisfaction with a dialog with the dialog system. In addition thereto, facial expressions and speech of the user during a dialog are recorded as source data based on which appropriate utterance timing and user's interest in the dialog are estimated. Objects are ten types of animals: an elephant, a giraffe, a hippopotamus, a lesser panda, a Tsushima leopard cat, a tiger, an owl, a gorilla, a penguin, and a tapir, which are highly popular animals. Signs in the zoo, the Web, and so forth were used to inform the visitors about the experiment. When a user participated in a dialog, the user got an explanation about how to have a dialog and was asked to set his/her nickname in a dialog and his/her age and gender and choose an object animal by using a tablet PC, and, only when the user was 18 years of age or older or a guardian was with the user, they got an explanation about acquisition of data such as video and was asked to consent to data acquisition. After the above-described preparations, a visitor and the robots actually had a dialog. It is to be noted that, due to constraints arising from the demonstration time and dialog stability, when the user made six utterances, the mode transitioned to an exit mode at a break between miniscenarios and dialog end processing was performed by urging the user to end the dialog by a message "The time is almost up". Moreover, after the dialog was over, a user evaluation was input on a scale of 1 to 5 (1: I don't think so, . . . , 5: I think so). On the assumption that dialog enjoyment and an interest in an object of a topic indicate the level of satisfaction with a dialog, the following three items were set as evaluation items: 1. Did you enjoy talking with the robots? (enjoyment), 2. Did you get interested in the animal you chose? (interest), and 3. Did you find a lot about the animal you chose? (knowledge).

(Results and Analysis)

Figure 8:
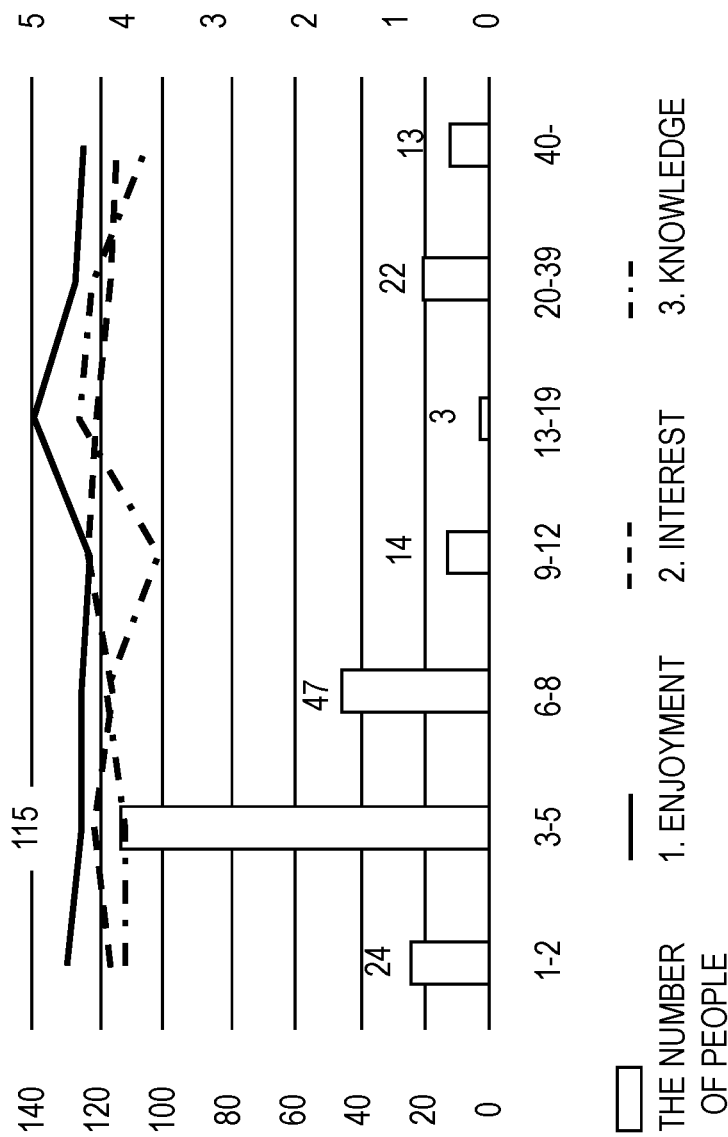
FIG. 8 is a diagram showing the simulation results.

The total number of people who participated in the experiment, including accompanying guardians, was approximately 400 to 600. Of these people, 238 people consented to data acquisition. In this experiment, analysis was conducted using only data of people who experienced the dialog and from whom valid consent was obtained. First, the evaluation values obtained from people who participated in the experiment were 1. enjoyment: 4.52, 2. interest: 4.28, and 3. knowledge: 4.04. This shows that the majority of people who experienced the dialog enjoyed the dialog because a value greater than or equal to 4.5 on a 1-to-5 scale is an extremely high value. On the other hand, as for 3. knowledge, although the evaluation value exceeded 4.0, it was somewhat lower than those of enjoyment and interest. Next, the age distribution and the evaluation value at each age are shown in FIG. 8. The experiment was initially conducted with children in the lower grades or so in elementary school in mind as visitors; in actuality, however, a great many preschoolers experienced the dialog. On the other hand, the results show that very few children in the middle or higher grades in elementary school and very few junior and senior high school students visited the zoo. The evaluation values of 1. enjoyment and 2. interest almost level off irrespective of age. As for 3. knowledge, although there is no significant difference, the evaluation values obtained from people in the age brackets of 6 to 8, 13 to 19, and 20 to 39 years are high, but there is a sharp drop in the evaluation value obtained from people in the age bracket of 9 to 12 years. The actual observation of people who experienced the dialog reveals that the level of knowledge of people in the age bracket of 6 to 8 years reasonably matches the level of the dialog system, which probably leads to a high level of satisfaction with knowledge. However, it can be considered that children aged around 9 to 12 who visit the zoo inherently have strong interest in animals and many of them have incredibly deep knowledge of animals, which makes them find knowledge tailored to little children unsatisfactory. On the other hand, it can be considered that, of people who are older than children aged around 9 to 12 and who are 13 years of age or older, in particular, 20 years of age or older, the number of visitors having general knowledge increases again and these people make evaluation comparing the level of interaction of the present dialog system and robots with that of commonly used dialog system and robots, which leads to high evaluation values. The numbers of males and females who experienced the dialog are respectively 116 and 119 (no answer: three people), and the evaluation values obtained from males are 4.47, 4.32, and 3.95 and the evaluation values obtained from females are 4.56, 4.23, and 4.11 and there is no significant difference. Moreover, qualitative analysis based on observations shows that it was often difficult for children aged 4 or younger to properly understand an utterance made by a robot (for example, they could not answer an open question in an appropriate manner) and a dialog was logically broken in many cases. However, the results shown in FIG. 8 reveal that many of them had an enjoyable dialog even in that state. This will give a clue to the essence of enjoyment of a dialog from a perspective other than the exchange of contents. In addition, after-dialog feedback contains majority opinion saying that even having a dialog this way (a repetition of a robot utterance→a human utterance→a dialog between robots) gave them a feeling of experiencing a smooth and continuous dialog. This form of dialog is similar to the form of questions and answers in structure if a dialog between robots is included in a response; however, the results indicating that even having a dialog this way gave people a feeling of experiencing a continuous dialog are very useful findings in advancing future dialog robot research. On the other hand, many people said that the robots were too talkative. The script was designed so as to frequently ask a person to say something, but people still found this insufficient; therefore, there may be a need to skillfully control timing for asking a person to say something and a pause in a dialog during which the user can easily interrupt the dialog. In particular, this experiment adopted Push-to-talk turn-taking for dialog stability, which might strengthen the impression that it was difficult for the user to interrupt the dialog unless he/she was asked to say something. This makes it necessary to perform design with consideration given to turn-taking control.

<First Modification>

In the above-described embodiment, when the robots finish uttering the set of four utterances and the user does not interrupt the dialog, a set of four utterances which the robots are made to utter next is identified, speech synthesis is performed in the speech synthesis unit 140, and presentation is made in the presentation unit 101-1 or 101-2 (S152). The following modification can be made here.

(1) When the Type of the Identified Set of Four Utterances is "Good Points"

The scenario type-inducing utterance generation unit 121 randomly selects a set-of-four-utterances ID from those of the type "good points". The scenario type-inducing utterance generation unit 121 transforms, using an assumed user utterance sentence corresponding to the selected set-of-four-utterances ID and a template in a form that asks the user a question, such as "Do you like the feature: <an assumed user utterance sentence>?", the assumed user utterance sentence and outputs the transformed assumed user utterance sentence. For example, the scenario type-inducing utterance generation unit 121 transforms an assumed user utterance sentence "The body is big" into an assumed user utterance sentence "Do you like the feature: <the body is big>?". Speech recognition is performed on a pickup signal of a user utterance made in response to the question, a Yes/No judgment is made for a response, and a sympathetic or unsympathetic response to the user utterance is uttered. Then, the response sentence for user utterance, the subsequent utterance sentence, and the subsequent response sentence which correspond to the set-of-four-utterances ID selected by the expression control unit 123 are output to the speech synthesis unit 140 (S123-2). It is to be noted that, when uttering a sympathetic response, the dialog system may express strong sympathy by rephrasing the user utterance using another assumed user utterance sentence which is similar to an assumed user utterance sentence not yet transformed. For example, the dialog system rephrases, using "Super big!" which is another assumed user utterance sentence similar to "The body is big", the user utterance by using an utterance sentence "Yeah, <super big!>".

(2) When the Type of the Identified Set of Four Utterances is "Questions"

The scenario type-inducing utterance generation unit 121 randomly selects a set-of-four-utterances ID from those of the type "questions". The scenario type-inducing utterance generation unit 121 makes a certain robot (for example, the robot R1) ask another robot (for example, the robot R2) a question like "That reminds me, <an assumed user utterance sentence>" using an assumed user utterance sentence corresponding to the selected set-of-four-utterances ID and makes R2 utter "The answer is, oh, do you know the answer?" to the user H like a quiz, which allows the user to join in the dialog in a more aggressive manner. Furthermore, (2-1) when it can be detected that a user utterance is an utterance to the effect that the user does not know the answer, the robot R1 expresses sympathy like "I don't know the answer either" and the robot R2 utters "The answer is <a response sentence for user utterance>", which allows the dialog to continue in a natural way.

(2-2) When the degree of similarity between text data corresponding to a user utterance and a response sentence for user utterance is high, the robot R2 expresses words, such as "That is correct! Well done", to the effect that the user's answer is correct, which allows the dialog to continue in a natural way.

(2-3) When a user utterance includes a content word related to the question, the robot R1 responds to the user utterance by saying "Uh-huh" and, at the same time, asks the robot R2 a question "And the answer is?" and the robot R2 utters "The answer is . . . <a response sentence for user utterance>", which allows the dialog to continue smoothly even when it is impossible to properly recognize whether the user utterance is a correct answer.

In any of (2-1) to (2-3), a subsequent utterance sentence and a subsequent response sentence which correspond to the set-of-four-utterances ID selected by the expression control unit 123 are then output to the speech synthesis unit 140 (S123-2).

(3) When the Type of the Identified Set of Four Utterances is "Trivia"

The scenario type-inducing utterance generation unit 121 randomly selects a set-of-four-utterances ID from those of the type "trivia". The scenario type-inducing utterance generation unit 121 makes a certain robot (for example, the robot R1) utter trivia to the user H like "That reminds me, <an assumed user utterance sentence>" using an assumed user utterance sentence corresponding to the selected set-of-four-utterances ID and makes another robot (for example, the robot R2) ask the user H a question "Oh, really? Do you know that?" while making the utterance to the robot R1, which not only allows knowledge to be simply displayed, but also allows the user H to join in the dialog actively.

(3-1) When it can be detected that a user utterance is an utterance to the effect that the user did not know the trivia, the robot R1 expresses sympathy like "I didn't know that either", which allows the dialog to continue in a natural way.

(3-2) When it can be detected that a user utterance is an utterance to the effect that the user knew the trivia, the robot R1 expresses admiration like "Wow", which allows the dialog to continue in a natural way.

In both (3-1) and (3-2), a subsequent utterance sentence and a subsequent response sentence which correspond to the set-of-four-utterances ID selected by the expression control unit 123 are then output to the speech synthesis unit 140 (S123-2).

<Second Modification>

In the present embodiment, if the degree of similarity is less than the threshold (no in S123-1), the expression control unit 123 outputs, to the speech synthesis unit 140, text data corresponding to an utterance sentence that responds to the user utterance and an assumed user utterance sentence, a response sentence for user utterance, a subsequent utterance sentence, and a subsequent response sentence which correspond to the received set-of-four-utterances ID. In this case, if the type of the assumed user utterance sentence is questions, the processing may be modified as follows.

In place of text data corresponding to an utterance sentence that responds to the user utterance and an assumed user utterance sentence, a response sentence for user utterance, a subsequent utterance sentence, and a subsequent response sentence which correspond to the received set-of-four-utterances ID, an utterance sentence that presents an external knowledge source is generated. For example, the robot R1 is made to utter "Sorry, but I don't know", for example, and the robot R2 is made to utter "Why don't we ask an animal keeper about that later?", for example, so as to present an external knowledge source.

This configuration allows the dialog to continue smoothly. It is to be noted that, if no utterance is made after the robot R1 utters "I don't know", the dialog stops there and the user feels that the robots have no intention of answering the question, which may demotivate the user to continue the dialog.

After the above-described utterance "Sorry, but I don't know" made by the robot R1, a question which is similar to the user utterance (in this case, the degree of similarity is less than or equal to the threshold) is retrieved from sets of four utterances of the type "questions" in the set-of-four-utterances storage 130 and the robot R2 utters "Oh, that reminds me, <an assumed user utterance sentence>", which makes it possible to continue the question using a topic related to the user utterance.

<Third Modification>

In the present embodiment, a plurality of sets of four utterances, each set being made up of four sentences: an assumed user utterance sentence, a response sentence for user utterance, a subsequent utterance sentence for these sentences, and a subsequent response sentence as a unit, are stored in the set-of-four-utterances storage 130; however, each set does not necessarily have to be a set of four utterances. A set of utterances only has to be a set of a plurality of utterances including, at the beginning thereof, four sentences: an assumed user utterance sentence, a response sentence for user utterance, a subsequent utterance sentence for these sentences, and a subsequent response sentence, and the number of utterances included in a set of a plurality of utterances may differ from set to set as long as the above-described four sentences are included at the beginning. It is only necessary to make the robot R1 or the robot R2 utter each of the fifth and subsequent utterance sentences included in a set of a plurality of utterances.

The first embodiment is an embodiment in which the number of utterances included in a set of a plurality of utterances is limited to four, and can be said to be an example of the present modification.

This configuration makes it possible to achieve the effect of the first embodiment and, in addition thereto, broaden a conversation more flexibly. It is to be noted that the first to third modifications can be appropriately combined as needed.

<Fourth Modification>

Figure 4:
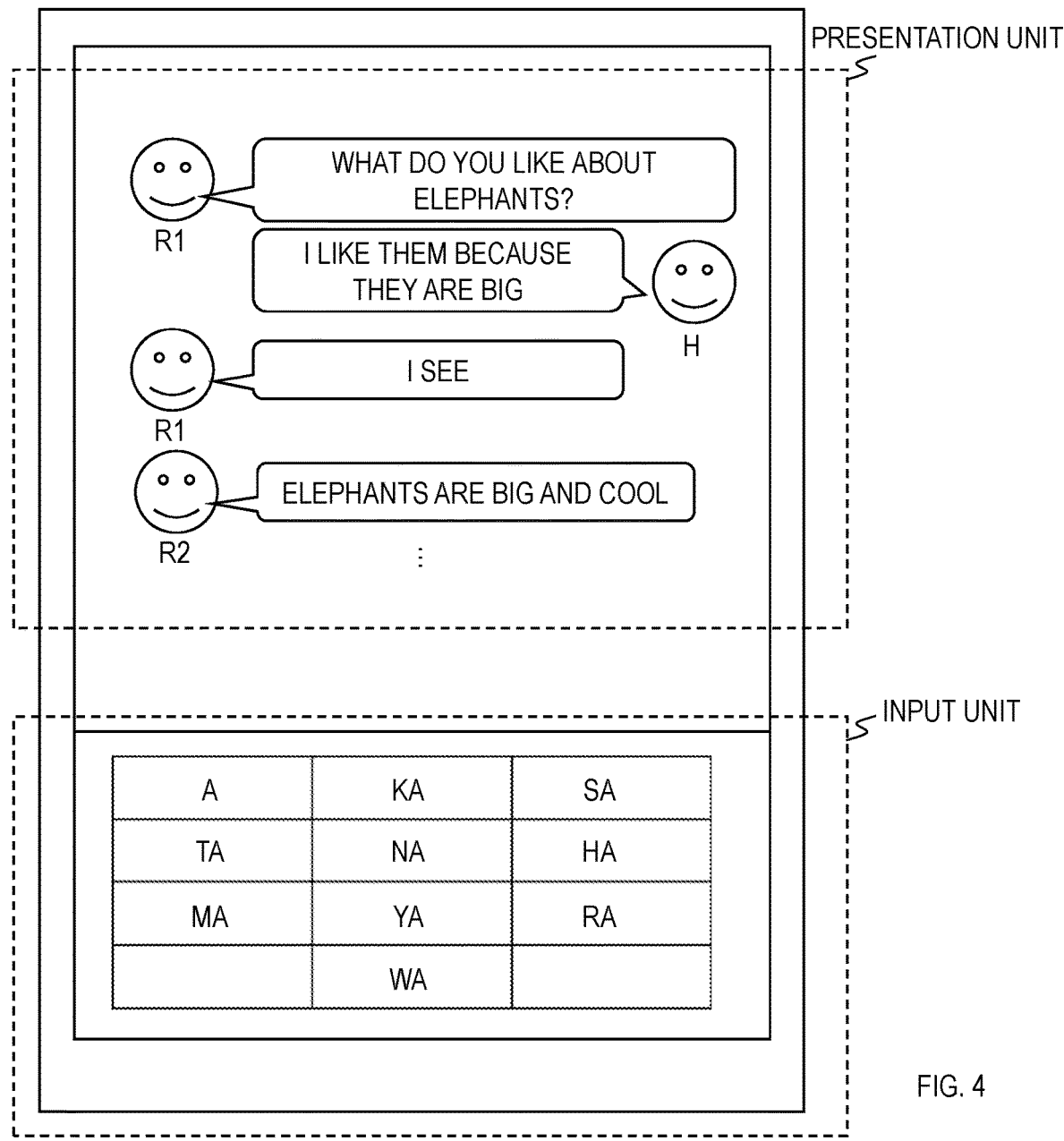
FIG. 4 is a diagram showing an example in which a text sentence indicating the contents of an utterance is displayed using a balloon from a chatbot.

The input units 102-1 and 102-2 may use text data from the user as input and the presentation units 101-1 and 101-2 may display a text sentence indicating the contents of an utterance input from the utterance determination unit on a display or the like in text form (see FIG. 4, for example). This allows the user to visually recognize an utterance made by the robot R1 or the robot R2, whereby a dialog between the user and the dialog system is achieved. In this case, a configuration including either one of the input units 102-1 and 102-2 and including either one of the presentation units 101-1 and 101-2 may be adopted. Moreover, the dialog system does not have to include the speech synthesis unit 140 and the speech recognition unit 110.

<Fifth Modification>

The expression control unit 123 of the present embodiment changes the details of processing depending on whether the degree of similarity is greater than or equal to the threshold or the degree of similarity is less than the threshold; however, this is an example and a configuration may be adopted in which the details of processing are changed depending on whether or not the degree of similarity is greater than the threshold. The scenario type judgment unit 122 obtains "information indicating whether or not the degree of similarity is greater than the threshold" in place of "information indicating whether or not the degree of similarity is greater than or equal to the threshold", and each unit performs processing based on this information.

Second Embodiment

A difference from the first embodiment will be mainly described.

This embodiment differs from the first embodiment in the details of processing which is performed by the scenario type judgment unit 122 and processing which is performed by the expression control unit 123.

(Scenario Type Judgment Unit 122)

Input: the user utterance, a set of utterances stored in the set-of-four-utterances storage 130

Output: a set-of-four-utterances ID, information indicating whether or not the degree of similarity is greater than or equal to the threshold, information indicating which of the assumed user utterance sentence, the response sentence for user utterance, and the subsequent utterance sentence is similar to the text data corresponding to the user utterance As in the case of the first embodiment, the scenario type judgment unit 122 judges whether or not the user utterance is a question sentence using the text data corresponding to the user utterance and the information on prosody.

If the text data corresponding to the user utterance is a question sentence, the scenario type judgment unit 122 performs the processing similar to that of the first embodiment.

If the text data corresponding to the user utterance is not a question sentence, the scenario type judgment unit 122 retrieves, from the set-of-four-utterances storage 130, a set-of-four-utterances ID corresponding to each of all the sets of four utterances other than those of the question type, calculates the degree of similarity between each of an assumed user utterance sentence, a response sentence for user utterance, and a subsequent utterance sentence and the text data corresponding to the user utterance (S122), and outputs a set-of-four-utterances ID of a set of four utterances including any one of an assumed user utterance sentence, a response sentence for user utterance, and a subsequent utterance sentence, which is most closely similar to the text data corresponding to the user utterance, information indicating whether or not the degree of similarity is greater than or equal to the threshold, and information indicating which of the assumed user utterance sentence, the response sentence for user utterance, and the subsequent utterance sentence is similar to the text data corresponding to the user utterance.

(Expression Control Unit 123)

Input: the set-of-four-utterances ID, the information indicating whether or not the degree of similarity is greater than or equal to the threshold, information indicating which of the assumed user utterance sentence, the response sentence for user utterance, and the subsequent utterance sentence is similar to the text data corresponding to the user utterance Output: an utterance that responds to the user's utterance, a similar utterance in the utterance sentences corresponding to the set-of-four-utterances ID If the text data corresponding to the user utterance is a question sentence, the expression control unit 123 performs the processing similar to that of the first embodiment.

If the text data corresponding to the user utterance is not a question sentence, the expression control unit 123 performs the following processing.

If the degree of similarity is greater than or equal to the threshold (yes in S123-1), the expression control unit 123 outputs, to the speech synthesis unit 140, text data corresponding to an utterance sentence that responds to the user utterance and an utterance sentence, which follows the utterance sentence indicated by the information indicating which of the assumed user utterance sentence, the response sentence for user utterance, and the subsequent utterance sentence is similar to the text data corresponding to the user utterance, using the received set-of-four-utterances ID and information indicating which of the assumed user utterance sentence, the response sentence for user utterance, and the subsequent utterance sentence is similar to the text data corresponding to the user utterance (S123-2). In this embodiment, an utterance sentence that responds to the user utterance is "Oh" or the like and is an indispensable utterance. After making the robot R1 or the robot R2 utter an utterance sentence that responds to the user utterance, the expression control unit 123 outputs an utterance sentence which follows the utterance sentence indicated by the information indicating which of the assumed user utterance sentence, the response sentence for user utterance, and the subsequent utterance sentence is similar to the text data corresponding to the user utterance.

The processing which is performed by the expression control unit 123 if the degree of similarity is less than the threshold (no in S123-1) is similar to that of the first embodiment.

<Effect>

This configuration makes it possible to achieve the effect similar to that of the first embodiment.

<Other Modifications>

The present invention is not limited to the above embodiments and modifications. For example, the above-described various kinds of processing may be executed, in addition to being executed in chronological order in accordance with the descriptions, in parallel or individually depending on the processing power of an apparatus that executes the processing or when necessary. In addition, changes may be made as appropriate without departing from the spirit of the present invention.

<Program and Recording Medium>

Further, various types of processing functions in the apparatuses described in the above embodiments and modifications may be implemented on a computer. In that case, the processing details of the functions to be contained in each apparatus are written by a program. With this program executed on the computer, various types of processing functions in the above-described apparatuses are implemented on the computer.

This program in which the processing details are written can be recorded in a computer-readable recording medium. The computer-readable recording medium may be any medium such as a magnetic recording apparatus, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage unit of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the apparatuses are assumed to be configured with a predetermined program executed on a computer. However, at least part of these processing details may be realized in a hardware manner.

What is claimed is:

1. A dialog apparatus, wherein
a plurality of sets of four utterances, each set (n) being made up of four sentences: an assumed user utterance sentence (n,1), a response sentence (n,2) for user utterance, a subsequent utterance sentence (n,3) for these sentences, and a subsequent response sentence (n,4), are stored, and
the dialog apparatus comprises processing circuitry configured to perform, in response to input of data corresponding to a user utterance, control such that:
any one of a plurality of agents utters, of a set (m) of four utterances that begins with an assumed user utterance sentence (m,1) which is similar to the data corresponding to the user utterance, each of a response sentence (m,2) for user utterance, a subsequent utterance sentence (m,3) for these sentences, and a subsequent response sentence (m,4), different agents utter the response sentence (m,2) for user utterance and the subsequent utterance sentence (m,3); and different agents utter the subsequent utterance sentence (m,3) and the subsequent response sentence (m,4).

2. A dialog method using a dialog apparatus, wherein a plurality of sets of a plurality of utterances, each set (n) including, at a beginning thereof, four sentences: an assumed user utterance sentence (n,1), a response sentence (n,2) for user utterance, a subsequent utterance sentence (n,3) for these sentences, and a subsequent response sentence (n,4), are stored, and the dialog apparatus includes processing circuitry and performs control, in response to input of data corresponding to a user utterance, such that:

any one of a plurality of agents utters, of a set (m) of a plurality of utterances that begins with an assumed user utterance sentence (m,1) which is similar to the data corresponding to the user utterance, each of a response sentence (m,2) for user utterance, a subsequent utterance sentence (m,3) for these sentences, and a subsequent response sentence (m,4);

different agents utter the response sentence (m,2) for user utterance and the subsequent utterance sentence (m,3); and different agents utter the subsequent utterance sentence (m,3) and the subsequent response sentence (m,4).

3. A dialog apparatus, wherein a plurality of sets of a plurality of utterances, each set (n) including, at a beginning thereof, four sentences: an assumed user utterance sentence (n,1), a response sentence (n,2) for user utterance, a subsequent utterance sentence (n,3) for these sentences, and a subsequent response sentence (n,4), are stored, and the dialog apparatus comprises processing circuitry configured to perform control, in response to input of data corresponding to a user utterance, such that:

any one of a plurality of agents utters, of a set (m) of a plurality of utterances that begins with an assumed user utterance sentence (m,1) which is similar to the data corresponding to the user utterance, each of a response sentence (m,2) for user utterance, a subsequent utterance sentence (m,3) for these sentences, and a subsequent response sentence (m,4);

different agents utter the response sentence (m,2) for user utterance and the subsequent utterance sentence (m,3); and different agents utter the subsequent utterance sentence (m,3) and the subsequent response sentence (m,4).

4. The dialog apparatus according to claim 3, wherein the assumed user utterance sentence (n,1) is a sentence that is assumed to be uttered by a user, the response sentence (n,2) for user utterance is a response sentence for the assumed user utterance sentence (n,1) and is a response sentence generated so as to be the same response sentence for user utterance for assumed user utterance sentences having the same meaning, the subsequent utterance sentence (n,3) is an utterance created so as to be judged to have topic continuity, based on a magnitude relationship between an index indicating topic continuity and a predetermined threshold, for a pair of an assumed user utterance sentence and a response sentence for user utterance which are associated with the subsequent utterance sentence (n,3), and the subsequent response sentence (n,4) is an utterance created so as to be judged to have topic continuity, based on a magnitude relationship between an index indicating topic continuity and a predetermined threshold, for a subsequent utterance sentence associated with the subsequent response sentence (n,4).

5. The dialog apparatus according to claim 3, wherein, the processing circuitry is configured to:

generate, using information indicating an object of contents of an utterance and information indicating that which defines a type of the contents of an utterance, a scenario type-inducing utterance sentence from a template utterance and the object, wherein the template utterance is associated with the type; and perform control such that, if a degree of similarity between data corresponding to a user utterance (u) uttered in response to the scenario type-inducing utterance sentence and an assumed user utterance sentence which is most closely similar to the data corresponding to the user utterance (u) is greater than a predetermined threshold or is greater than or equal to a predetermined threshold, any one of a plurality of agents utters, of a set of four utterances that begins with the assumed user utterance sentence which is most closely similar to the data corresponding to the user utterance (u), a response sentence for user utterance, a subsequent utterance sentence for these sentences, and a subsequent response sentence and, if the degree of similarity is less than or equal to a predetermined threshold or is less than a predetermined threshold, after any one of a plurality of agents utters an utterance sentence that does not include a content word, any one of a plurality of agents utters each of a set of four utterances that begins with an assumed user utterance sentence which is most closely similar to the data corresponding to the user utterance (u).

6. The dialog apparatus according to claim 3, comprising:

wherein, the processing circuitry is configured to:

generate, using information indicating an object of contents of an utterance and information indicating that which defines a type of the contents of an utterance, a scenario type-inducing utterance sentence from a template utterance and the object, wherein the template utterance is associated with the type, and the object; and perform control such that, if a degree of similarity between data corresponding to a user utterance (u) uttered in response to the scenario type-inducing utterance sentence and any one of an assumed user utterance sentence, a response sentence for user utterance, and a subsequent utterance sentence, which is most closely similar to the data corresponding to the user utterance (u), is greater than a predetermined threshold or is greater than or equal to a predetermined threshold, any one of a plurality of agents utters, of a set of four utterances including the assumed user utterance sentence, the response sentence for user utterance, or the subsequent utterance sentence, which is most closely similar to the data corresponding to the user utterance (u), each of utterance sentences which follow the assumed user utterance sentence, the response sentence for user utterance, or the subsequent utterance sentence, which is most closely similar to the data corresponding to the user utterance (u), and, if the degree of similarity is less than or equal to a predetermined threshold or is less than a predetermined threshold, after any one of a plurality of agents utters an utterance sentence that does not include a content word, any one of a plurality of agents utters each of a set of four utterances that begins with an assumed user utterance sentence which is most closely similar to the data corresponding to the user utterance (u).

7. A non-transitory computer-readable recording medium that records a program for making a computer function as the dialog apparatus according to claim 3.

\* \* \* \* \*